United States Patent
Newton et al.

(10) Patent No.: US 10,348,848 B2
(45) Date of Patent: *Jul. 9, 2019

(54) HANDLING LONG-TAIL CONTENT IN A CONTENT DELIVERY NETWORK

(71) Applicant: Level 3 Communications, LLC, Broomfield, CO (US)

(72) Inventors: Christopher Newton, Westlake Village, CA (US); Kevin Johns, Erie, CO (US); William Power, Boulder, CO (US)

(73) Assignee: Level 3 Communications, LLC, Broomfield, CO (US)

( * ) Notice: Subject to any disclaimer, the term of this patent is extended or adjusted under 35 U.S.C. 154(b) by 110 days.

This patent is subject to a terminal disclaimer.

(21) Appl. No.: 14/870,381

(22) Filed: Sep. 30, 2015

(65) Prior Publication Data

US 2016/0094471 A1  Mar. 31, 2016

Related U.S. Application Data

(60) Provisional application No. 62/057,762, filed on Sep. 30, 2014.

(51) Int. Cl.
*H04L 12/911* (2013.01)
*H04L 29/08* (2006.01)

(52) U.S. Cl.
CPC ...... *H04L 67/2842* (2013.01); *H04L 67/1004* (2013.01)

(58) Field of Classification Search
CPC .......................... H04L 47/70; H04L 67/2842
See application file for complete search history.

(56) References Cited

U.S. PATENT DOCUMENTS

| 7,991,883 | B1 | 8/2011 | Streeter et al. |
| 8,433,771 | B1* | 4/2013 | Ellsworth ............. H04L 67/125 709/213 |
| 8,930,538 | B2 | 1/2015 | Fullagar et al. |
| 2006/0069746 | A1* | 3/2006 | Davis ..................... H04L 67/28 709/218 |
| 2008/0147974 | A1* | 6/2008 | Madison ............. G06F 12/0897 711/118 |

(Continued)

OTHER PUBLICATIONS

International Preliminary Report on Patentability, dated Apr. 4, 2017, Int'l Appl. No. PCT/US15/053107, Int'l Filing Date Sep. 30, 2015; 6 pgs.

(Continued)

*Primary Examiner* — Andrew C Georgandellis

(57) ABSTRACT

A content delivery network has at least a first tier of servers. A content delivery method includes, at a first server in the first tier of servers, obtaining a request from a client for a resource. If the resource is available at the first server or at a peer of the first server, then the resource is served to the client from the first server. Otherwise, it is determined whether the resource is popular, and if the resource is determined to be popular, then the first server obtains the resource and the first server serves the resource to the client. If the resource is determined not to be popular, the server contacts a second server to obtain the resource, not in the first tier of servers, and the second server provides the resource to the first server. The first server is instructed not to cache the unpopular content.

14 Claims, 10 Drawing Sheets

(56) References Cited

U.S. PATENT DOCUMENTS

| | | |
|---|---|---|
| 2009/0254661 A1 | 10/2009 | Fullagar et al. |
| 2010/0332595 A1* | 12/2010 | Fullagar ............. H04N 7/17354 709/203 |
| 2012/0159558 A1* | 6/2012 | Whyte ................. H04N 21/222 725/95 |
| 2012/0198075 A1* | 8/2012 | Crowe ................ H04L 67/2847 709/226 |
| 2013/0204961 A1* | 8/2013 | Fliam ................. H04L 67/2885 709/214 |

OTHER PUBLICATIONS

International Search Report dated Dec. 29, 2015, Int'l Appl. No. PCT/US15/053107, Int'l Filing Date Sep. 30, 2015; 3 pgs.
Written Opinion of the International Searching Authority dated Dec. 29, 2015, Int'l Appl. No. PCT/US15/053107, Int'l Filing Date Sep. 30, 2015; 4 pgs.
Extended European Search Report, dated Feb. 20, 2018, Application No. 15847993.1, filed Sep. 30, 2015; 9 pgs.
Singapore Written Opinion, dated Jan. 17, 2018, Application No. 11201702599Q, filed Sep. 30, 2015; 5 pgs.
Singapore Invitation to Respond to Written Opinion, dated Dec. 17, 2018, Application No. 11201702599Q, filed Sep. 30, 2015; 6 pgs.

* cited by examiner

FIG. 6

| Hash Slot | Time Bucket 1 | Time Bucket 2 | ... | Time Bucket 16 |
|---|---|---|---|---|
| | | | | |
| | | | | |
| ... | ... | ... | ... | ... |
| | | | | |

600

HANDLING LONG-TAIL CONTENT IN A CONTENT DELIVERY NETWORK

RELATED APPLICATIONS

This application claims priority under 35 U.S.C. § 119(e) from U.S. Patent Application No. 62/057,762 filed Sep. 30, 2014, titled "HANDLING LONG-TAIL CONTENT IN A CONTENT DELIVERY NETWORK the entire contents of which are incorporated herein by reference for all purposes.

This application is also related to the following co-owned and co-pending patent applications, the contents of each of which are fully incorporated herein by reference for all purposes:

| Application No. | Filing Date |
|---|---|
| 10/073,938 | Feb. 14, 2002 |
| 11/715,316 | Mar. 08, 2007 |
| 11/978,656 | Oct. 30, 2007 |
| 11/980,672 | Oct. 31, 2007 |
| 10/259,497 | Sep. 30, 2002 |
| 11/932,162 | Oct. 31, 2007 |
| 11/976,648 | Oct. 26, 2007 |
| 12/408,681 | Mar. 21, 2009 |

TECHNICAL FIELD

This invention relates to content delivery, to content delivery networks (CDNs), and to frameworks and systems using CDNs.

Glossary

As used herein, unless stated otherwise, the following terms or abbreviations have the following meanings:
1. IP means Internet Protocol.
2. IP address means an address used in the Internet Protocol to identify electronic devices such as servers and the like.
3. HTTP means Hypertext Transfer Protocol.
4. URL means Uniform Resource Locator.
5. DNS means Domain Name System.

SUMMARY

One implementation of the present disclosure may take the form of a method for content delivery in a content delivery network. The method includes the operations of receiving, at a first server of a first tier of servers of the content delivery network, a request from a requesting device for a resource available from the content delivery network, accessing a popularity service associated with the content delivery network to determine a popularity designation associated with the requested resource, and requesting the resource from a second server of the content delivery network. In addition, the method includes processing, at the first server of the first tier of servers, a redirect command from the second server of the content delivery network to obtain the resource from a content server of the content delivery network and providing the obtained resource to the requesting device.

Another implementation of the present disclosure may take the form of a content delivery network. The network may include a first tier of servers comprising a first plurality of servers, an edge server of the first tier of servers receiving a request from a requesting device in communication with the first server for a resource available from the content delivery network and a second tier of servers comprising a second plurality of servers, a first server of the second plurality of servers receiving a request from the edge server for the content and, in response, transmitting a redirect command intended for the requesting device to the edge server to obtain the resource from a content server. The content delivery network may also include a popularity service tracking a popularity designation associated with the requested resource and may be configured such that the edge server processes the redirect command to obtain the content from the content server and provides the obtained content to the requesting device.

Yet another implementation of the present disclosure may take the form of a method of content delivery in a content delivery network. The method includes the operations of receiving, at a first server of a first tier of servers of the content delivery network, a request from a requesting device for a resource available from the content delivery network, accessing a popularity service associated with the first server of the first tier of the content delivery network to determine a popularity designation associated with the requested resource, and receiving an instruction to not cache the resource at the first server of the first tier of servers. The method may also include requesting the resource from a second server of the content delivery network based at least on the popularity designation associated with the requested resource and providing the obtained resource to the requesting device

BRIEF DESCRIPTION OF THE DRAWINGS

The present invention can be better understood with reference to the following drawings. The elements of the drawings are not necessarily to scale, emphasis instead being placed upon clearly illustrating the principles of the present invention. Furthermore, like referenced numerals designate corresponding parts throughout the several views.

FIG. 6 is an exemplary data structure for maintaining the popularity data in a particular popularity server;

BACKGROUND AND OVERVIEW

The Internet and the so-called World Wide Web (the "WWW") have become ubiquitous. Thousands or even tens of thousands of so-called content providers (publishers) now use the Internet (and, particularly, the WWW) to provide all sorts of content to tens or even hundreds of thousands of clients all over the world.

In order to offload the job of serving some or all of their content, many content providers now subscribe to so-called content delivery networks (CDNs). Using a CDN, some (or all) of a content provider's content can be served to clients from the CDN (i.e., from one or more servers in the CDN) instead of from the content provider's server(s). In a caching CDN, content that is served may also be cached on some or all of the CDN servers, either before being served or in response to specific requests for that content.

Certain publishers have large content libraries in which only a small proportion of the content (the so-called "short head") is popular enough to benefit from serving through a caching CDN, while the majority of the content (the so-called "long tail") is accessed only occasionally and not generally worth caching. This situation would be typical for a content publisher with a very large music or video library. Some music content—the popular content—may be regularly requested, whereas other music—the not popular (also referred to as unpopular) content—may be seldom if ever requested.

DETAILED DESCRIPTION

The term "content" as used herein means any kind of data, in any form, regardless of its representation and regardless of what it represents. Content may include, without limitation, static and/or dynamic images, text, audio content, including streamed audio, video content, including streamed video, web pages, computer programs, documents, files, and the like. Some content may be embedded in other content, e.g., using markup languages such as HTML and XML. Content includes content which is created or formed or composed specifically in response to a particular request. The term "resource" is sometimes used herein to refer to content.

Content can become popular (by various measures of popularity) or fade into relative obscurity dynamically, so a content library cannot easily be explicitly partitioned. Instead, the CDN tracks popularity of certain content, and selectively migrates content toward the edge (i.e., toward the tier 1 servers) as that content becomes popular.

Figure 1:
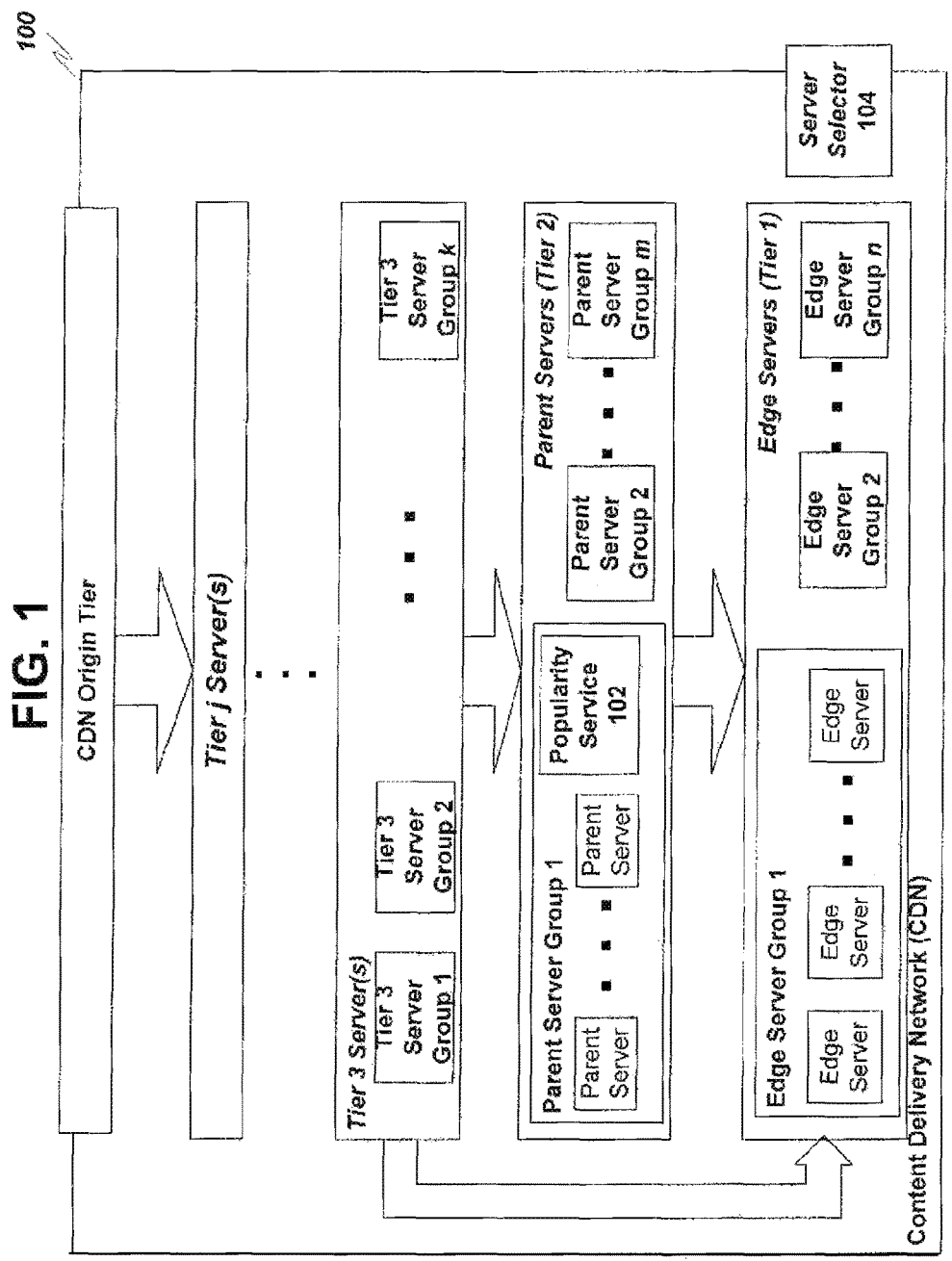
FIG. 1 depicts a general hierarchical, multi-tiered content delivery network (CDN)

A CDN may have one or more tiers of servers, organized hierarchically. FIG. 1 depicts a content delivery network 100 that includes multiple tiers of servers. Specifically, the CDN 100 of FIG. 1 shows j tiers of servers, denoted Tier 1, Tier 2, Tier 3, . . . , Tier j. Each tier of servers may comprise a number of servers organized into server groups (sometimes referred to as server clusters). The Tier 1 servers are also referred to as edge servers, and Tier 1 is sometimes also referred to as the "edge" or the "edge of the CDN." The Tier 2 servers (when present in a CDN) are also referred to as parent servers.

For example, in the CDN 100 of FIG. 1, Tier 1 has n groups of servers (denoted "Edge Server Group 1", "Edge Server Group 2", . . . , "Edge Server Group n"); tier 2 (the parent servers' tier) has m server groups (the i-th group being denoted "Parent Server Group i"); and tier 3 has k server groups, and so on. Preferably each tier has the same number of server groups.

Figure 2:
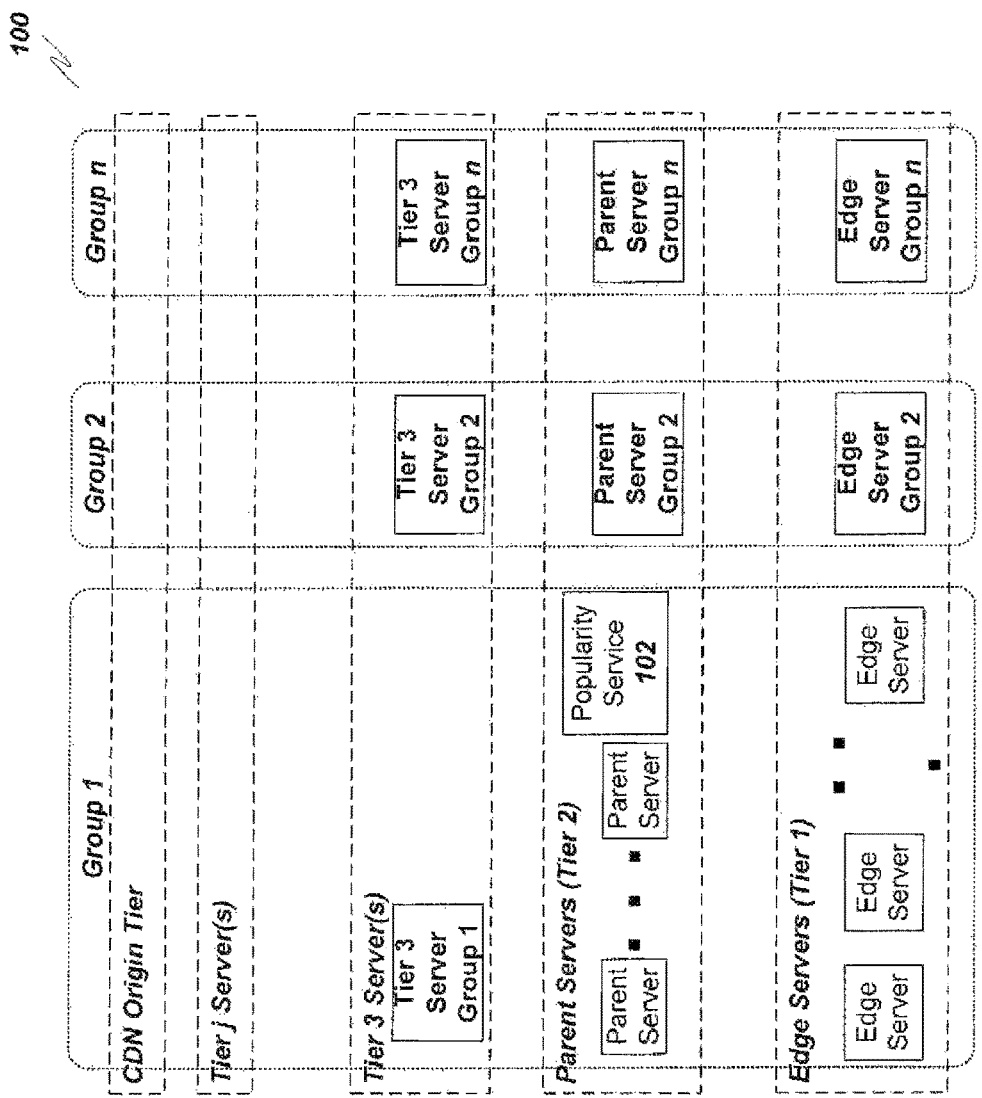
FIG. 2 shows the logical organization of servers into groups or clusters in a CDN.

FIG. 2 shows the logical organization/grouping of servers in a CDN of FIG. 1. In the exemplary CDN of FIG. 2, each tier of servers has the same number (n) of server groups. Those of skill in the art will know and understand, upon reading this description, that each server group may have the same or a different number of servers. Additionally, the number of servers in a server group may vary dynamically. For example, additional servers may be added to a server group to deal with increased load on the group.

The servers in a server group may be homogenous or heterogeneous, and each server in a server group may comprise a cluster of physical servers sharing the same name and/or network address. An example of such a cluster is described in co-owned U.S. Pat. No. 8,886,814 (titled "Load-balancing cluster", filed May 21, 2103), the entire contents of which are incorporated herein by reference for all purposes.

Servers in the same tier and the same group are referred to as peers or peer servers.

A typical CDN has only one or two tiers of servers. A CDN with only one tier will have only edge servers, whereas a CDN with two tiers will have edge servers and parent servers. (At a minimum, a CDN should have at least one tier of servers—the edge servers.)

The grouping of servers in a tier may be based, e.g., on their physical or geographical location. For example, a particular CDN may have six groups—four groups of servers in the United States, group 1 for the West Coast, group 2 for the mid-west, Group 3 for the northeast and Group 4 for the south east; and one group each for Europe and Asia.

In general, some or all of the servers in each tier can exchange data with some or all of the servers in each other tier. Thus, some or all of the parent servers can exchange information with some or all of the edge servers. For the sake of simplicity, in the drawings, each tier of servers is shown as being operationally connectable to each other tier. In some CDNs, however, it may be preferable that the servers in a particular tier can only exchange information with other servers in the same group (i.e., with peer servers) and/or with other servers in the same group in a different tier. For example, in some CDNs, the edge servers in edge server group k, can exchange information with each other and with all servers in parent server group k, and so on.

A content provider's/customer's server (or servers) are also referred to as origin servers. A content provider's origin servers may be owned and/or operated by that content provider or they may be servers provided and/or operated by a third party such as a hosting provider. The hosting provider for a particular content provider may also provide CDN services to that content provider.

A CDN may also include a CDN origin/content cache tier which may be used to cache content from the CDN's subscribers (i.e., from the CDN subscribers' respective origin servers). Those of skill in the art will know and understand, upon reading this description, that a CDN can support one or more subscribers, i.e., that a CDN can function as a shared infrastructure supporting numerous subscribers. The CDN origin tier may also consist of a number of servers, and these servers may also be organized (physically and logically) into a number of regions and/or groups. The server(s) in the CDN origin tier obtain content from the subscribers' origin servers, either on an as needed basis (a pull) or in advance (via a push).

Figure 3:
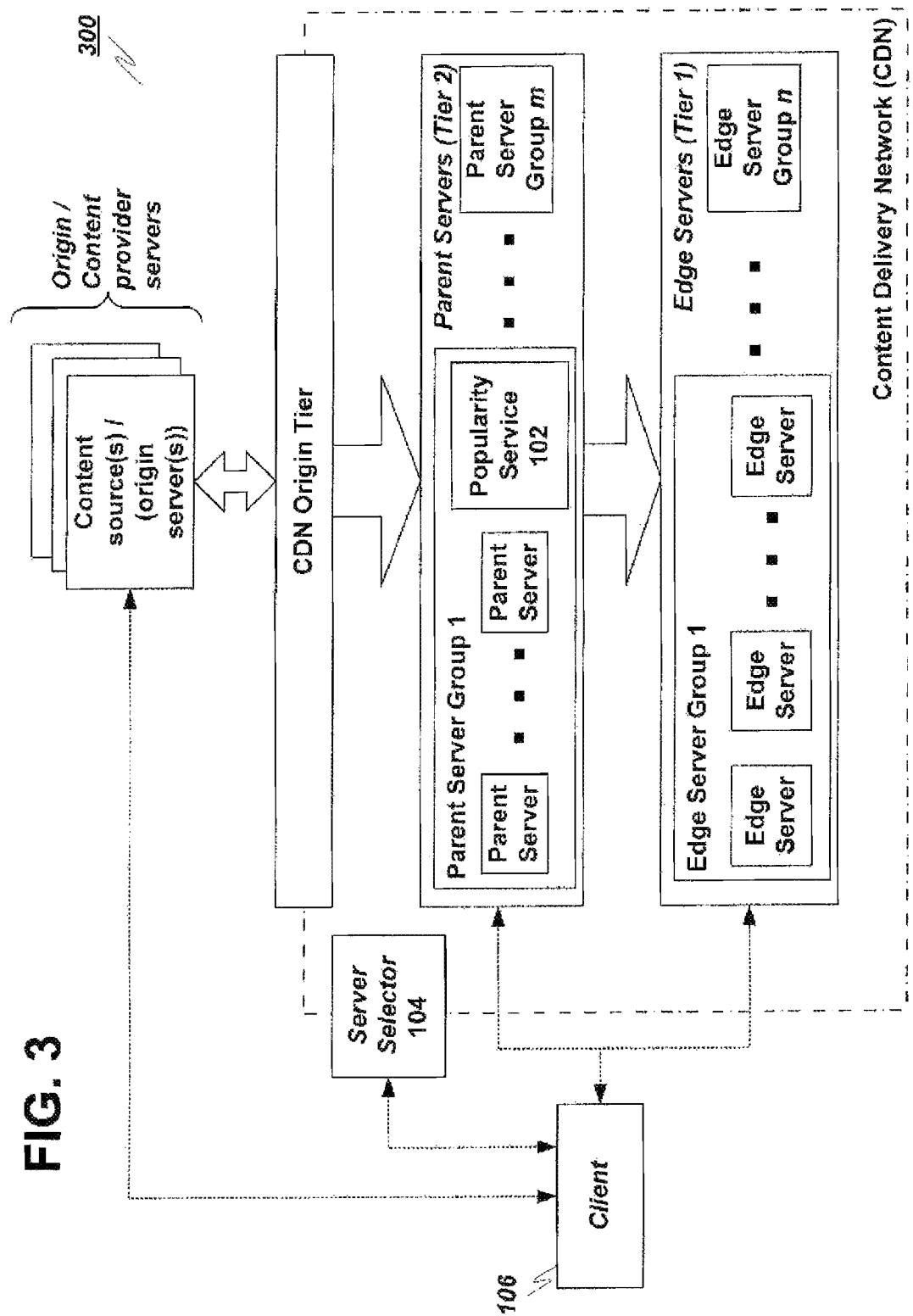
FIG. 3 depicts a content delivery framework (CDF) using a content delivery network (CDN)

As shown in FIGS. 1-3, a popularity service 102 (described in greater detail below) is associated with one or more of the server groups in one or more tiers. In an exemplary embodiment, some of the parent server groups have popularity services 102 associated therewith. Although shown as a separate component of the group, the popularity service 102 may be integrated into one or more of the servers in the group. In general, the popularity service 102 may be associated or integrated into any server or server group of the CDN. In some cases, the popularity service may have its own server, distinct from any of the CDN servers. The terms "popularity service" and "popularity server" are used interchangeable herein.

In operation, when a client requests content that is to be served using a content delivery framework, the client may be served that content from a server in the CDN or, in some cases, from the subscriber/customer's origin server. The content delivery framework may include the CDN as well as the origin server layer.

A client may be directed to a CDN and/or to a server in the CDN in any manner using any kind of server selector system 104. As understood by those of skill in the art, the server selector system 104 generally operates to direct a client's requests for content to an appropriate server in order for that content to be served to the requesting client. An appropriate server may be one which is close to the client (by some measure of cost) and/or one which is not too heavily loaded. All sorts of conditions may be applied to the term "appropriate", and all sorts of information and tests, both static and dynamic, may be used to determine an appropriate server. The server selector system 104 may, e.g., include or operate fully or partially in Domain Name Service (DNS) servers, standalone devices, or a combination thereof. For example, the server selector system 104 may comprise a single level DNS server that selects an appropriate server based at least in part on some combination of the location of the requesting client and the load on some or all of the CDN servers. Those of skill in the art will know and understand, upon reading this description, that a client's location in a network such as the Internet may sometimes only be roughly determined, and the term "location of the client" is generally taken to be a network location corresponding to the client's network service provider.

Although shown as a component in the drawings, the server selector 104 may comprise numerous components. For example, some or all of the server selection may be based on anycast routing, and the server selector 104 may then include routers and associated tables.

In a presently preferred embodiment the server selector 104 is an intelligent traffic manager (ITM)/adaptive traffic controller (ATC) such as described in co-pending U.S. patent application Ser. No. 10/259,497, filed Sep. 30, 2002, and titled "Configurable Adaptive Global Traffic Control And Management," (published as US 2003-0065762 A1); and in U.S. patent application Ser. No. 11/976,648, filed Oct. 26, 2007, titled "Policy-based content delivery network selection," (collectively the "ITM applications"), the entire contents of each of which have been incorporated herein by reference for all purposes. In some embodiments the server selector 104 may include a "best" or "optimal" server selector such as disclosed in U.S. Pat. No. 6,185,598 titled, "Optimized Network Resource Location," the entire contents of which are incorporated herein by reference for all purposes. The '598 patent refers to CDN servers as so-called repeater servers, and describes a so-called "Best Repeater Selector (BRS) mechanism".

FIG. 3 shows a content delivery framework 300 with a two-level hierarchical CDN consisting of a tier of edge servers (Tier 1) and a tier of parent servers (Tier 2). Some or all of the edge servers can communicate with some or all of the parent servers. The edge servers are divided into n edge server groups, and the parent servers are divided into m parent server groups. In one embodiment, the value of m is equal to the value of n, i.e., in this embodiment there are the same number of edge server groups as there are parent server groups. A CDN origin/content cache tier stores subscriber content which it obtains from the various subscribers' origin servers. At least one of the parent server groups (in the drawing, Group 1) has a popularity service 102 associated therewith. Preferably more than one parent server group has an associated popularity service, and more preferably each parent server group has an associated popularity service.

As mentioned above, although shown in a parent tier, the popularity service may be located anywhere in the system, including in the edge tier. Further, the popularity service may be used by certain, though not necessarily all, content. When only certain content uses the popularity service, content should be designated in order to use the popularity service.

Some or all of the edge servers in a group may use a popularity service to manage the long-tail content of various subscribers. Each edge server that uses a popularity service is referred to as being bound to that popularity service. An edge server that is bound to a popularity service is sometimes referred to herein as a "longtail coserver."

Figure 4:
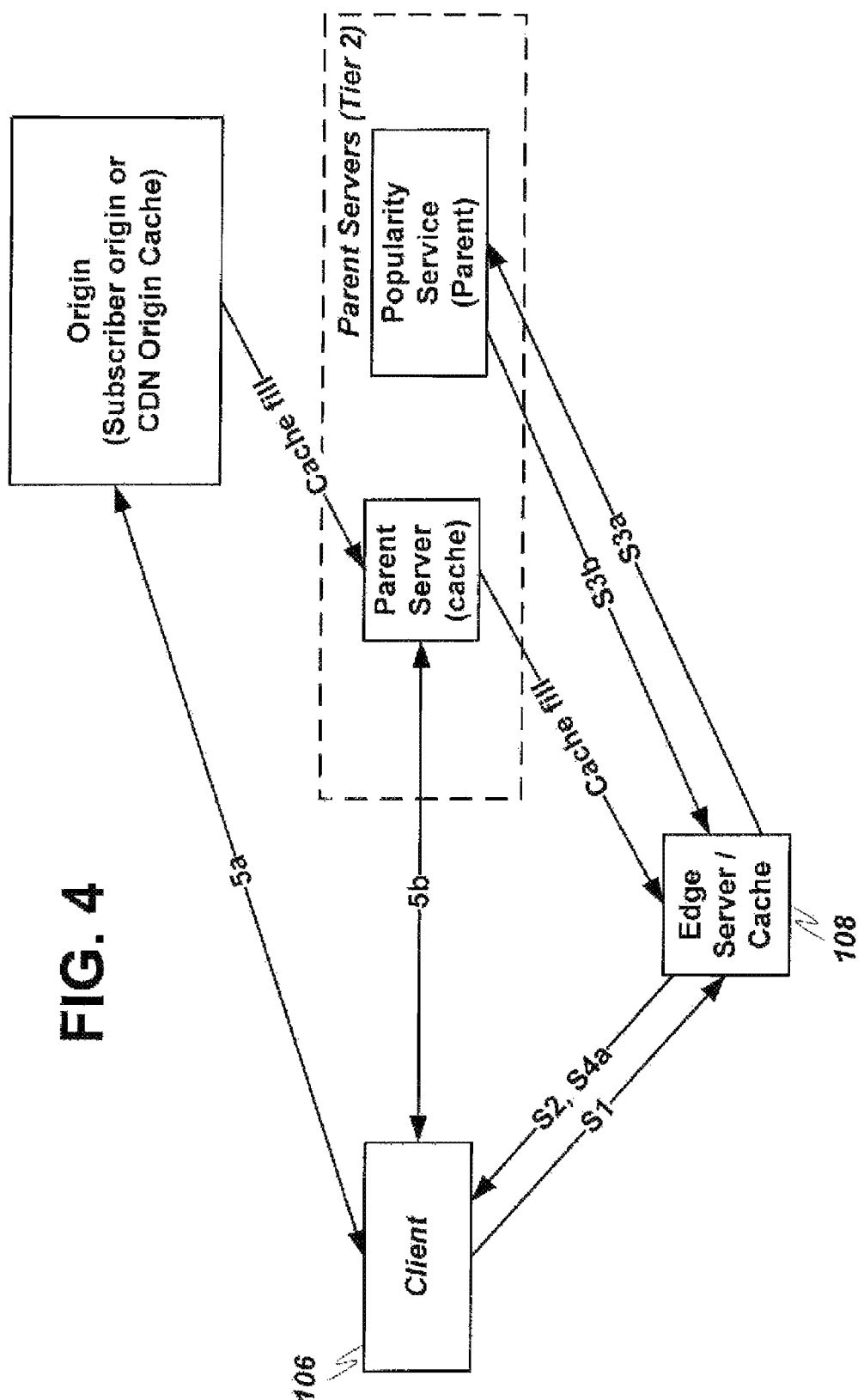
FIG. 4 depicts the operation of a two-level content delivery network in a content delivery framework.
Figure 5:
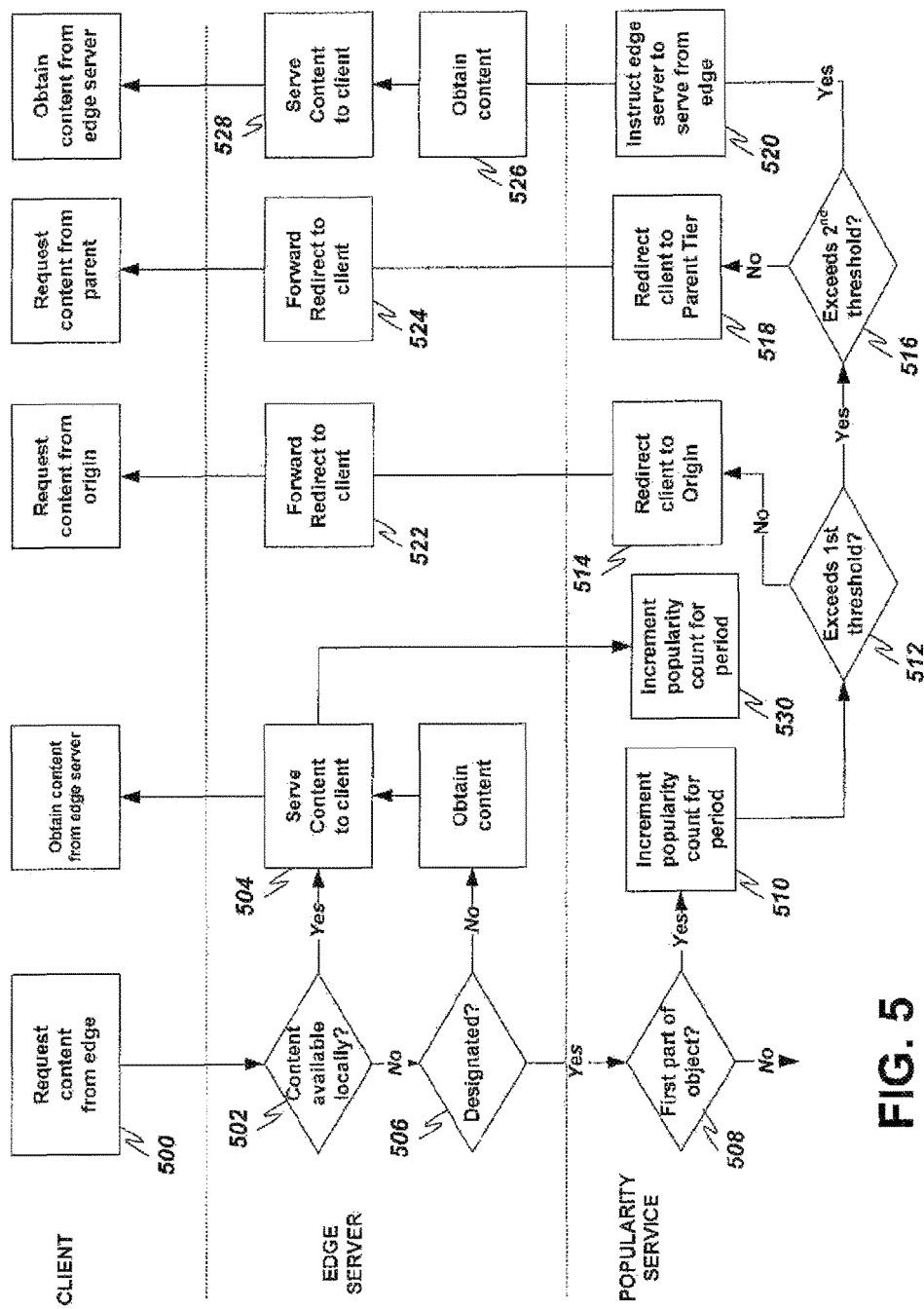
FIG. 5 is a flowchart illustrating operations of the popularity services of the CDN of FIG. 4.

FIGS. 4 and 5 show the operation of the popularity services of the CDN of FIG. 3. When a client 106 requests content (e.g., using an HTTP GET request), that request is directed (e.g., by server selector 104) to an edge server 108 in order for the content to be served to the client. For certain designated content a popularity check is interposed into the fill side of the caching operation. FIG. 4 illustrates the flow of messages and data in the content delivery framework 300, and FIG. 5 is a flowchart showing operation of the popularity services of the CDN of FIG. 4. For the sake of this particular explanation, assume that the client's request has been directed to edge server 108. (Those of skill in the art will know and understand, upon reading this description, that the client's initial request may be directed to any tier in the CDN hierarchy, including, e.g., to the parent tier.) This server is selected using the server selection mechanism 104 associated with the CDN, e.g., using one or more DNS servers and selecting an edge server based on such factors as the location of the requesting client, the load on the network, network traffic conditions, CDN policies, subscriber policies, and the like.

A client 106 requests content from an edge server 108 (at 500 in FIG. 5). The request from the client 106 arrives at edge server 108 (51 in FIG. 4). The edge server 108 checks to see if the object is present (locally or on a peer) and fresh (at 502). If so, the edge server 108 serves the object to the client 104 from the cache (S2, 504), obtaining the object from a peer, if necessary.

In some embodiments, the system may distinguish between on-net and off-net peers and same-switch peers. An on-net peer is a peer on the same backbone network; an off-net peer is a peer located on a different backbone network; and a same-switch peer is a peer directly connected to the same switch as the agent performing the check. In some embodiments, the edge server 108 may only look for the object on some of its peers (e.g., only on same-switch peers) (at 502).

If the object is not available on the edge server 108 or on a peer, the edge server 108 ascertains whether this object is served based on its popularity (i.e., whether this object has been designated so that the object's popularity will be used to determine where it will be served from) (at 506). If so, then the request is sent to the popularity service 102 associated with the edge server 108, in this case, to the popularity server for the same group (S3a).

The determination as to whether this object is designated to be served from a different location, depending on its popularity (at 506), may be made based, at least in part, on the name (hostname) used to request the object.

In one implementation, the CDN provides a mix of edge servers, some performing popularity checking (as described above), while others do not. For those that are not running the popularity service, the name (hostname) used to fill an object will resolve to a parent server (that may or may not provide popularity services). If the parent server does not provide popularity services, then the content will be obtained by the edge server from that parent server, and the content will be served to the client.

A request for content may be an initial request for an object or it may be a request for another part of an object, the initial part having already been served to the client. If the request is for the first part of the object (at 508), e.g., the request includes a request for the first byte of the resource (i.e., it is not a range request that starts after the beginning of the file), the popularity service 102 determines (as described below) if the object is currently popular. In other implementations, another portion of the object may be requested. The popularity determination of an object may be performed for each portion of the object or may be performed only for requests for the first byte of the resource.

One particular implementation for providing the content to the requesting device is now discussed. An alternate implementation is discussed below with reference to FIGS. 7-9. In the embodiment of FIG. 5, the popularity count for the current period is incremented (at 510) when a request for the object is received. Based on its determination, the popularity service 102 returns one of three possible responses to the edge server 108 (S3*b*):

1. If the object has not reached a first/minimal level of popularity (at 512): the popularity service sends the edge server an instruction (e.g., HTTP 302) to redirect the client's request to the origin server (or to the CDN origin cache) (if origin redirects are enabled) (at 514).
2. If the object's popularity has exceeded the first/minimal level of popularity but has not yet exceeded a second, mid-tier threshold (at 516): the popularity service sends the edge server an instruction (e.g., HTTP 302) to redirect the client's request to a parent server (if mid-tier redirects are enabled) (at 518).
3. If the object's popularity has exceeded the mid-tier threshold (i.e., the object is popular): The popularity service sends the edge server an instruction to serve the content itself (at 520). In this implementation, the popularity service sends the edge server a redirect (HTTP 302) with a "follow me" or "cache" flag set, to the origin server or, if there is one, to the parent tier.

If the edge server 108 receives a redirect from the popularity service 102 without the "follow me" flag set (cases 1 and 2 above), it simply forwards the redirect to the client 104 (S4*a*, 522, 524). If the edge server 108 receives a "follow me" redirect, it obtains and caches the resource (at 526) and serves it to the client (at 528). If the popularity service 102 is unreachable, unresponsive, or returns a status code indicating an error (other than HTTP 404), the object is served out of the edge's cache server (and an alert condition is raised) after the object is retrieved from the origin server or the parent tier.

In one particular implementation, once content has been cached at an edge server, the edge server will send notifications (e.g., in the form of revalidations) to the popularity service every time it gets another request for that content. For example, with reference to the flowchart of FIG. 5, if the edge server 108 determines (at 502) that it has the requested content (or can obtain it from a peer), then, in addition to serving the content (at 504) or separate from serving the content, it also instructs the popularity server to increment the objects popularity count for the current period (at 530). This process keeps the popularity servers up to date on the relative popularity of content being served in their region.

Those of skill in the art will know and understand, upon reading this description, that in a multi-tier CDN, the popularity service may be located at any tier, or there may be popularity services at more than one tier.

Continuing the method of FIG. 4, Step (4*a*) may reply with content (if popular), or with a redirect to a parent or origin server (if not), in which the client will make another request (5*a* or 5*b*) to that tier to obtain the content. However, as mentioned above, other implementations of the CDN are also contemplated. One such implementation where the content is served to the client from the edge server, regardless of if the content is deemed popular by the CDN, is described in more detail below.

While the invention has been described with reference to the HTTP protocol, those of skill in the art will know and understand, upon reading this description, that different and/or other protocols may be used and are contemplated by the inventors. HTTP is described in various documents, e.g., Hypertext Transfer Protocol—HTTP/1.1, RFC 2616, Network Working Group, the entire contents of which are incorporated herein by reference.

Those of skill in the art will know and understand, upon reading this description, that different thresholds may be established for each tier in the CDN. Further, those of skill in the art will know and understand, upon reading this description that each content item may have its own thresholds associated therewith. In this manner, the system can check all content for popularity, with the default thresholds being zero. In this manner, every request will automatically cause the popularity to exceed the threshold and will cause the content to be cached.

By positioning Popularity Servers regionally (paired with parent cache servers), popularity and cache tiers can be managed independently, on a regional basis. For example, popularity may be based on a metropolitan area that includes one or more tiers of CDN servers. Content that is popular in one region/group may not be popular in another region/group (especially if each region/group corresponds to a geographic and/or political region).

In one implementation, rendezvous to popularity servers may prioritize so-called "regional" proximity, so that clients within the same region will tend to cast their popularity "votes" within that region and get consistent treatment of popular resources. However, if there are multiple parent cache servers available, there will generally be no attempt to rendezvous particular clients to particular parents.

Figure 6:
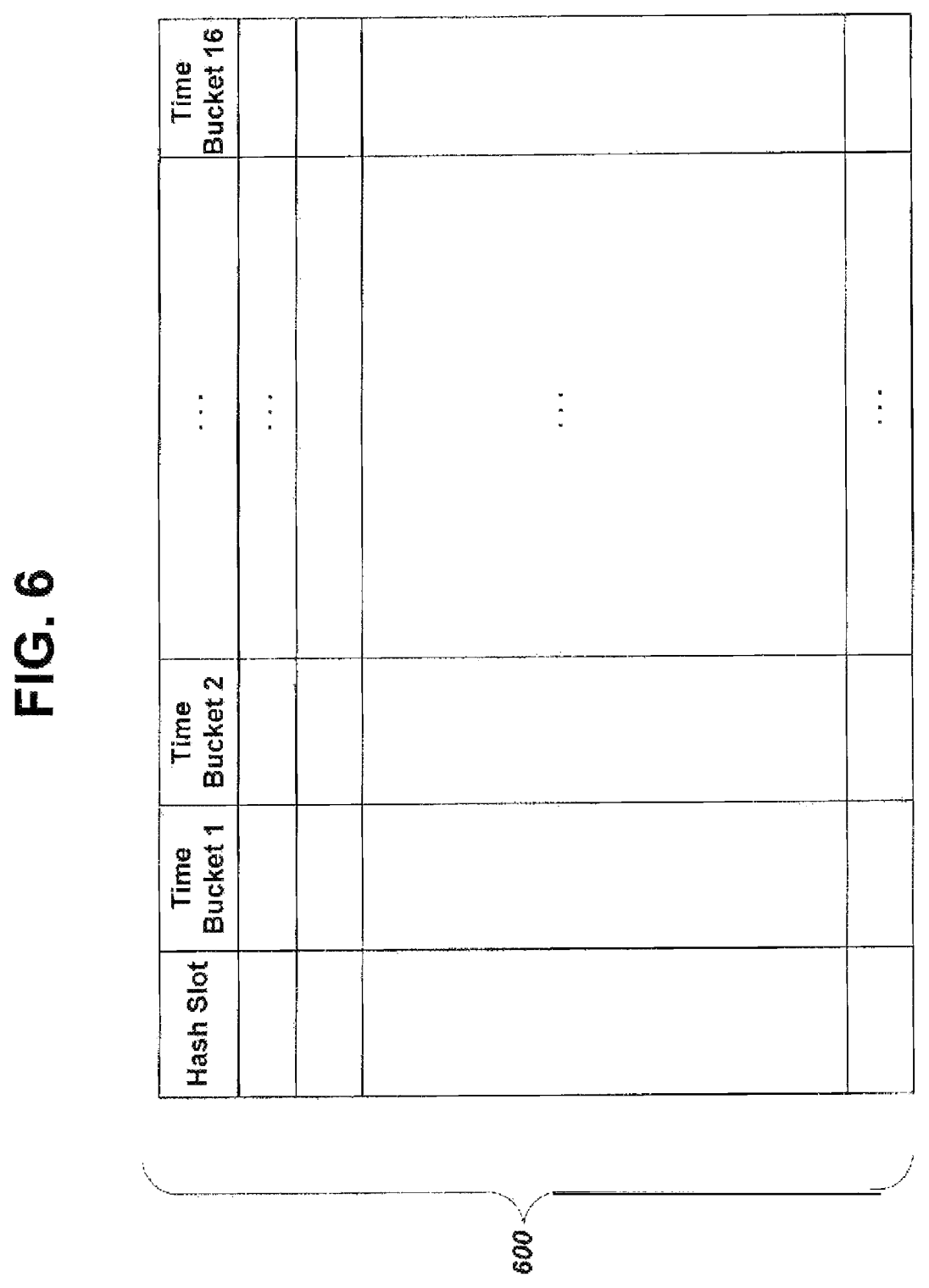

In some embodiments, popularity in an object/resource is measured based on the number of times that object/resource is requested in various time periods. FIG. 6 is an exemplary data structure for maintaining the popularity data for a particular popularity server. The data structure 600 in FIG. 6 is a so-called tally hash structure.

In some embodiments, some or all servers of the CDN are associated with (or bound to) popularity servers. A server or other component of the CDN that is bound to a popularity server is sometimes referred to as a bound Longtail coserver. Each popularity server in the system allocates a tally hash structure 600 per bound Longtail coserver. A configuration provides the number of resource (hash) slots to allocate. For one particular implementation, the number of hash slots is on the order of 100 million slots per coserver. Each slot is divided into a number of time buckets, preferably 16 time buckets, each bucket being represented by, e.g., a 4-bit unsigned integer. Those of skill in the art will know and understand, upon reading this description that the selection of the size of the value in each time bucket depends on policy decisions about bounds for the popularity thresholds, and for keeping very popular resources at the edge. Each time bucket may represent a time period, preferably a number of seconds.

The mapping of requests/content to slots is based on some function of the object name and perhaps other information associated with the request for the object. In one example, the mapping of objects to slots is based on a hash or message digest function (such as MD5 or the like) over the object name (and preferably including some parts of the query string). Each slot may therefore represent one or more resources. Each time a query/request arrives at a popularity server for an object, the hash is computed and the slot in the table 600 (for the appropriate co-server) is determined, and the counts in that slot are used. In event of a hash collision, it is therefore possible that one slot will be receiving and representing counts for more than one object. Since this result is generally undesirable (since it could result in cache fills and edge caching of unpopular objects), the number of slots should be chosen to be as large as practical. In one implementation, a Uniform Resource Locator (URL) of the request/content may be stored with each slot to avoid collisions.

In one implementation, particularly when the popularity data is held at a parent server or origin server, the CDN may store the popularity of an object as additional metadata in the cache (and as stub resources at a non-origin server when the resource is not in cache). Further, some objects or resources may have their popularity score tied to other resources, but not necessarily influence the score for the particular object. For example, popularity tracking may be done for just HTML resources of the CDN, while the popularity of embedded resources within a particular HTML page may be considered popular. Thus, the popularity of the enclosing object may be used rather than the embedded resources.

Those of skill in the art will know and understand, upon reading this description, that different and/or other data structures may be used to implement the popularity counting. For example, since in most cases the total number of resources is expected to far exceed the number of popular resources, a balanced b-tree may be preferable to a hash table. In addition, it is possible to reduce the size of the hash slot by using only some part of the hash. However, reducing the number of bytes of the hash used can result in more name collisions.

Although described above with respect to popularity, those of skill in the art will know and understand, upon reading this description, that other factors may be used along with (or instead of) popularity to determine whether or not to redirect requests. A rule base may be used to augment and/or override the popularity measures for certain resources. The rules in the rule base may be static or dynamic and may be set by the CDN administrator and/or the subscriber. For example, a subscriber may not want to pay for certain content to be served from the edge, regardless of its popularity, and may set a rule accordingly (this particular result could also be achieved by setting the thresholds for that particular content to prevent it from ever being cached at the edge).

Occasional log mining could be used to look for hash collisions in actual subscriber content libraries, and the hash function and bucket sizes could be tuned as needed. Further, at each time bucket boundary, the popularity service may logically "rotate" the buckets and zero out the oldest tally data for each object. Whenever a coserver's enrollment in the popularity service changes (added or dropped, or perhaps hints changed), the data structures are to be updated. Also, in one implementation, the popularity of a given object may be determined as a weighted sum of its popularity over successive time periods. More recent time periods may be given higher weights.

In order to determine which content is to be managed by the popularity service, the CDN operator and/or the subscriber may specify:

The tiers at which the content will be managed—edge, intermediate or parent (in some cases), or origin (subscriber's or storage tier). In order to be meaningful, at least one of intermediate and origin service should be enabled.

content that is to be managed based on its popularity, rather than simply always being served from a cache.

Each server in a network may be addressed by means of one or more network address (e.g., Internet Protocol or IP addresses). Each server in a network may also be known by one or more names (so-called hostnames—fully qualified domain names). Hostnames may be mapped to one or more IP addresses. A hostname may correspond to (and thus resolve to) more than one server. A system such as ITM (described in the ITM patent applications mentioned above), allows a kind of hostname (called a supername) to refer to multiple servers, and resolves the supername to a nearby server. In one implementation, the server selection mechanism is ITM, and each popularity server is accessed via a supername that resolves to reach a nearby popularity server.

When a popularity server shares or is co-located with a parent server, the parent server may use the name by which it was addressed to determine whether to direct a request to the popularity service. That is, parent cache servers that provide popularity service may recognize requests that use one of the aliases reserved for popularity requests, and call into the popularity service to make the fill/no fill decision and return a redirect as described above.

A server's hostnames are also referred to as its aliases. Each Longtail coserver preferably has at least two aliases (three if a parent cache/server tier is used): the published supername, the hostname used for popularity service requests, and (if used) the hostname used for parent cache redirects.

Popularity servers may be reached via an ITM supername, and ITM will monitor for the service's availability across the set of servers. Popularity servers are typically reached using real IP addresses, and not virtual IPs, and will not necessarily be redundant within a cluster. Redundancy can be provided by having multiple servers per supername. However, preferably there will be no attempt to synchronize the popularity tallies on popularity servers, with the expected desirable effect of managing popularity separately on a "regional" basis, the granularity being determined by the number and distribution of popularity servers deployed. Should a popularity server fail, this could cause a discontinuity in popularity responses as a new server becomes active for a given edge location, but this may be mitigated (for very popular resources) by periodic background refreshes.

Information about the resources and caching strategy include the following:

the expected total number of resources associated with this coserver.

the number of buckets used to store hit counts for each resource.

the number of seconds that each bucket represents. Every time this interval goes by, the count in the oldest bucket is thrown out and a new bucket is started with a count of zero.

when the sum of all buckets for a given resource reaches the parent threshold on any popularity server, the parent caches (if any) that use that server will start to cache the resource.

when the sum of all buckets for a given resource reaches the edge threshold on any popularity server, the edge caches that use that server will start to cache the resource.

the hash algorithm to apply to the resource names (optional). If not specified, a default algorithm (e.g. MD5) will be used.

the maximum number of this coserver's resources that should be in cache at an edge at any given time. This value may be ignored in certain embodiments.

the maximum number of this coserver's resources that should be in cache at a parent at any given time. This value may be ignored in certain embodiments.

Those of skill in the art will know and understand, upon reading this description, that a decision to serve at a given tier that is based only on popularity counts, will not take into account capacity to serve at that tier—so this scheme could overload an origin server or parent tier if they do not have sufficient capacity. Further, if popularity is measured in terms of absolute thresholds on numbers of requests, and if the library is sufficiently large, this could cause cache thrashing at the parent or edge tiers. Dynamic adjustment of the popularity threshold levels of the parent and/or edge servers may account for this circumstance. Thus is provided a feature that allows a CDN to be responsive to increasing or decreasing "popularity" of content by shaping where in the CDN content is positioned and served from.

Alternatively to providing a redirect to the requesting client such that the client receives the content from an origin server, the content server (e.g., edge server) may process the redirect directly. In some instances and even though a redirect is a conventional HTTP command, some client devices, applications, browsers, and the like are unable to process redirect commands without causing a warning or error, or causing a warning or error if the redirect is to a different domain. One such warning or error is referred to as a cross domain security warning that may prevent the client device from redirecting properly to the origin server. Hence, by having the edge or other CDN device obtain the content intended to be obtained through the redirect instead of the client device and passing the content to the requesting client, such errors and warnings may be avoided.

Figure 7:
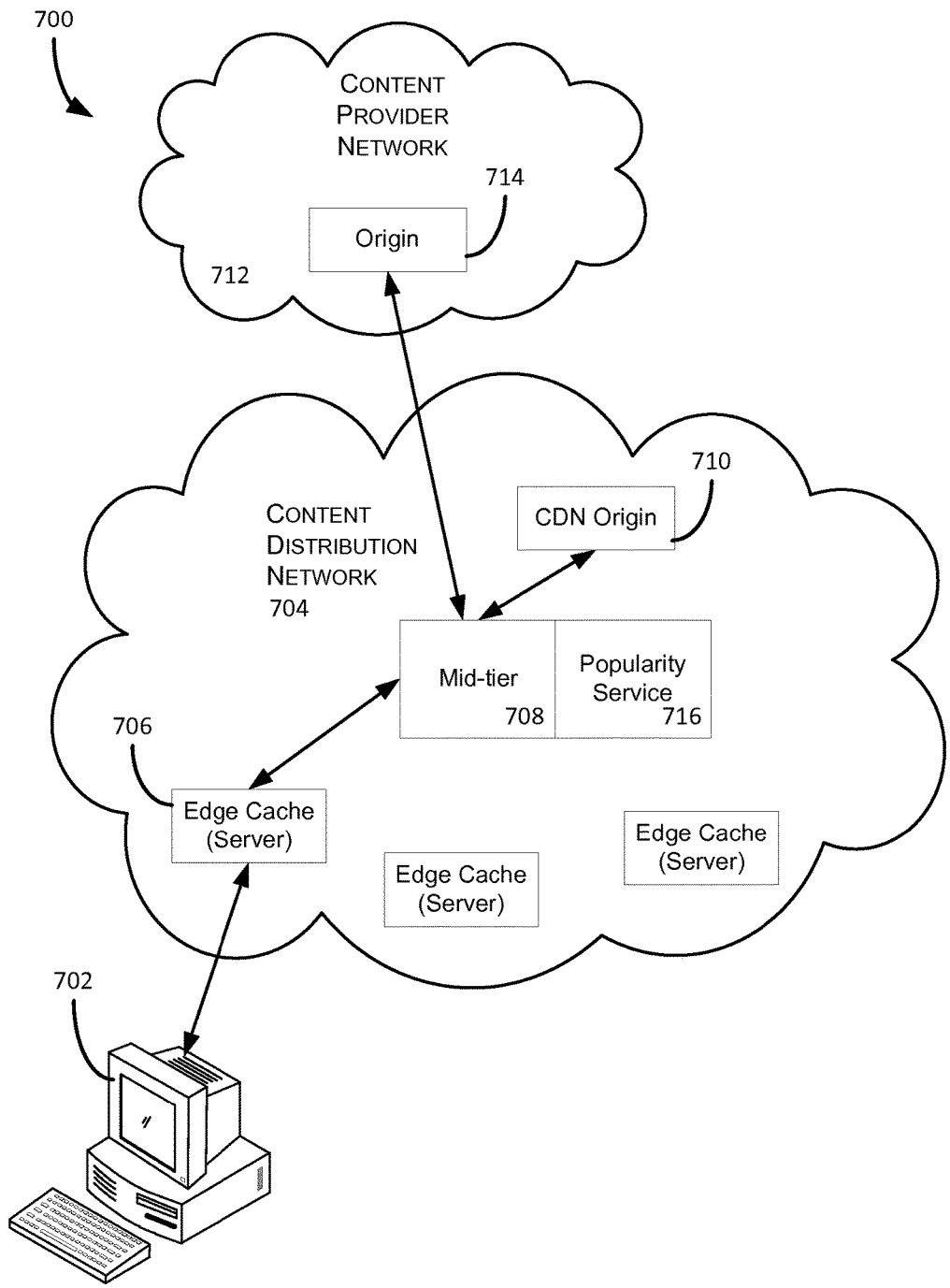
FIG. 7 is a diagram of a metro area CDN architecture.
Figure 8:
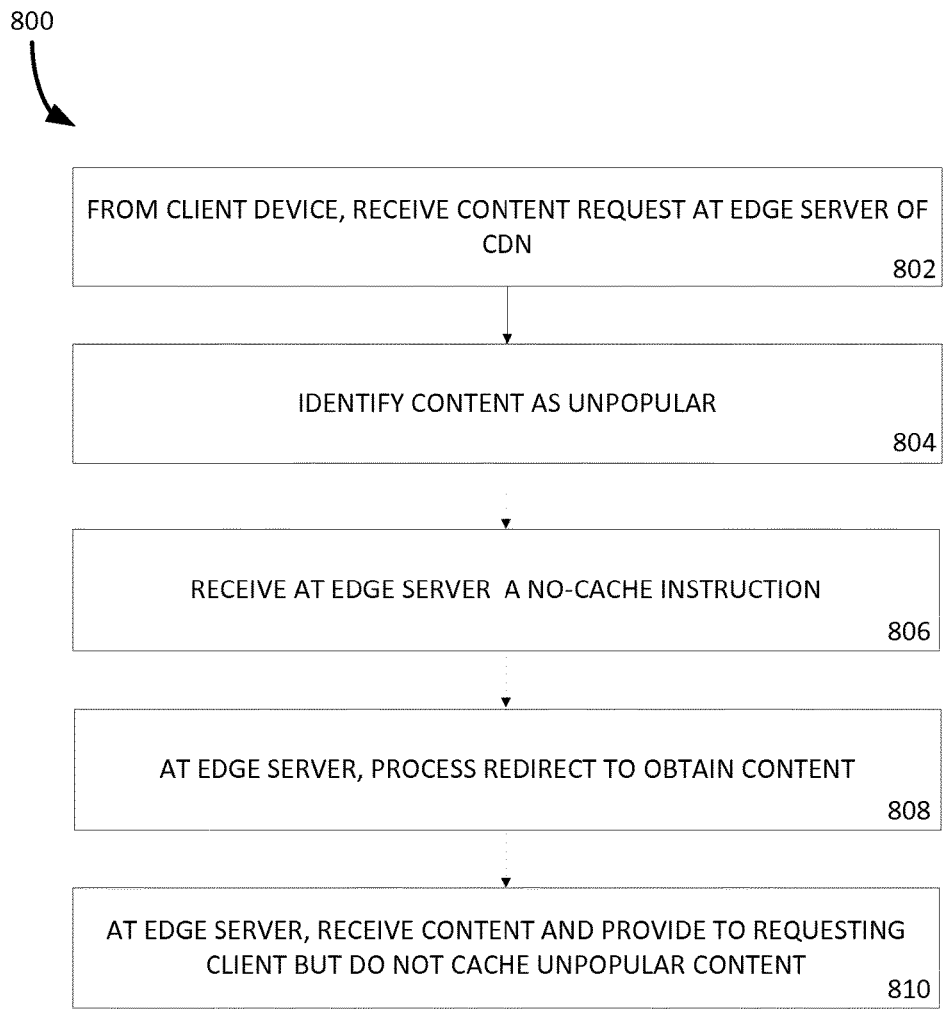
FIG. 8 is a flow diagram depicting a method of serving content from a CDN to a requesting client where the content is not cached.
Figure 9:
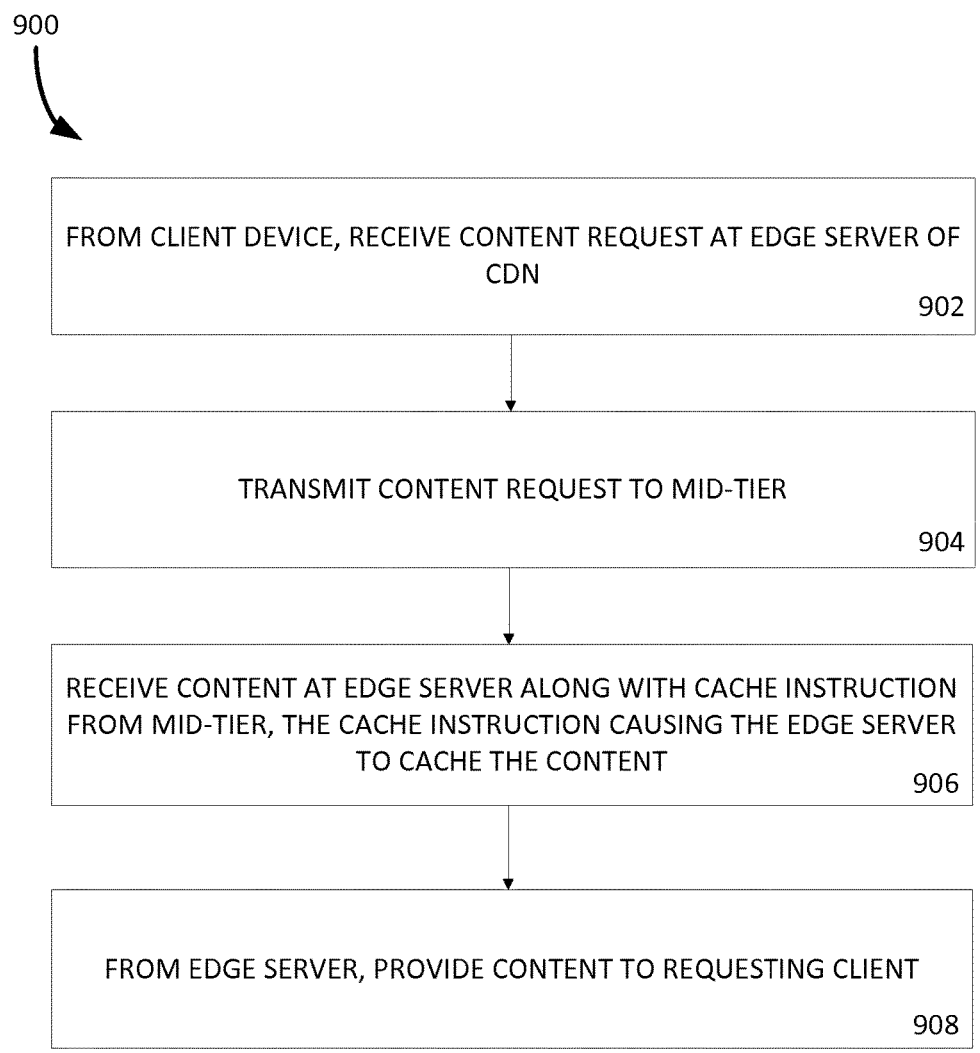
FIG. 9 is a flow diagram depicting a method of serving content from a CDN to a requesting client where the CDN caches the content at an edge server.

Referring to FIGS. 7 and 8 or 9, as discussed herein, a content request (e.g., a resolved request for www.example.com or www.example.com/video) is received at a content server of a content delivery network. In one example, the content server may be an edge server. It is also possible that the content server may be a device in one of the other tiers discussed above, such as a parent server or origin server.

FIG. 7 is a diagram of a metro area CDN architecture 700. Similar to the networking environment discussed above, the CDN includes a client device 702 in communication with a CDN 704. The CDN includes several tiers of servers, namely a tier of edge servers 706, a tier of parent servers 708, and a tier of origin servers, whether the origin server is embodied in the CDN 704 (such as origin server 710) or in content provider network 712 (such as origin server 714). A popularity service 716 is also included in the CDN 702 at the mid-tier server 708. The popularity service 716 operates as described above to track the popularity of one or more objects provided by the CDN 702 and instructs one or more components of the CDN to cache objects based on the popularity of the object or content.

Although shown in FIG. 7 as including particular components, it should be appreciated that any number of possible CDN architectural arrangements with various server tiers, origins and the like may take advantage of aspects of this disclosure. In one specific example, the edge caches 706 are part of a CDN metro, and the mid-tier server 708 is a metro mid-tier. Hence, popularity may be tracked and content cached at the metro level by the popularity service 716. Such an implementation provides a level of geographic discernment to the popularity analysis. In some CDN implementations, a level of geographic proximity analysis is conducted during DNS resolution such that the client 702 is provided with a content server geographically proximate with the client device. In many instances, a client requesting content within a certain metropolitan region will be provided with the address of a content server 706 within the metro servicing the same metropolitan region. Accordingly, using a popularity service 716 associated with the same metropolitan region allows content tracking based on popularity of the content within that metropolitan region. In such an instance, local sports stories, news stories, locally popular video clips, etc., may become popular and be cached in the edges 706 of the metro where the content is popular but not necessarily in geographic areas and metros where the content is not popular.

Through the use of a metro mid-tier server 708, many advantages are achieved. For example, locating a metro mid-tier (MMT) server proximate to the edge server 706 may minimize or reduce latency and infrastructure cost by directly connecting the edge server to the mid-tier server rather than utilizing routing fabric to be reached from the edge. Further, the use of the MMT 708 may allow very large libraries to be held close to the edge server 706, such that the very popular content is cached at the edge but the bulk is held within the MMT. Finally, the construction of the MMT 708 means that linear scaling of capacity is possible without having end-user/publisher visible complications (such as using multiple hostnames to stripe the content).

As mentioned above, in some instances, it may benefit the client device 702 and/or the CDN 704 to serve the content from the edge server tier 706. More particularly, one or more of the edge servers or caches 706 may be configured to process a redirect command intended for the client device 702 connected to the CDN 704. In addition, the edge server 706 may be configured to cache popular content to serve the content in response to a future request or to not cache unpopular content and instead provide the content from a parent 708 or origin server 710, 712.

FIG. 8 is a flow diagram depicting a method of serving content from a CDN to a requesting client where the content is not cached. In this implementation 800, a request for content is received at the edge server (e.g. the edge server 706) in operation 802. In one example, the edge server may determine whether the edge server has a cached and current (non-stale) copy of the content. In such an instance, the edge server returns the requested content to the requesting device (e.g., the client 702). Otherwise, the edge server contacts the mid-tier for an initial popularity analysis in operation 804. As discussed above, if the requested is unpopular as determined by the popularity service 716, a redirect command is returned to the client device 702 to redirect the client device to request the content from another server of the CDN 704 that has the content. In the earlier described embodiment, the redirect would have caused the client device 702 to be redirected to a different device with the CDN 704, e.g., the CDN origin 710 or a customer origin 714, to obtain the requested content. However, in the embodiment of FIG. 8, to avoid returning a redirect to the client 702, the edge server 706 may instead process the redirect or otherwise obtain the content and provide it to the client.

In one example, the edge server 706 directly processes the redirect and contacts the source of the content 708, 710 for a copy of the content. In the implementation illustrated in FIG. 7, the popularity service 716 associated with the mid-tier metro server 708 tracks the popularity of the requested content. By contacting the popularity service 716, the CDN 704 determines that the requested content is not popular in operation 804.

In operation 806, the edge server 704 contacts the mid-tier 708 or other server hosting the content to receive the content in operation 806. In addition to returning the requested content, the mid-tier server 708 may also return a cache or no-cache instruction. In such an instance, the mid-tier 708 may have the content or may need to retrieve the content from the CDN origin 710, the customer origin 714, a different tier or otherwise. Regardless, the mid-tier 708, in conjunction with the popularity service 716, determines or otherwise identifies the popularity of the content. For unpopular content, the mid-tier 708 returns a no-cache instruction to the content server 706.

In the instance where the mid-tier 708 does not have the content, the mid-tier 708 may return a redirect to a component that hosts the requested content in addition to the no-cache instruction. The edge server 706 may process the redirect on behalf of the client 702. In particular, the edge server 706 requests the content from the host of the content (such as the CDN origin server 710 or the client origin 714) in operation 808. The content host then returns the content to the edge server 706. The edge server 706 receives the content and provides the content to the requesting client 702 in operation 810. In this manner, the edge server 706 may process the redirect returned by the mid-tier 708 on behalf of the requesting device 702 to avoid the potential for an error or warning in processing the redirect. In addition, the edge server 706 does not cache the content in response to the no-cache instruction.

In an alternate implementation, the requested content may be deemed to be popular by the popularity service 716 of the CDN 704. In particular, FIG. 9 is a flow diagram depicting a method 900 of serving content from a CDN to a requesting client where the CDN caches the content at an edge server. Similar to above, the request for content is received at the edge server (e.g. the edge server 706) in operation 902. In response, the edge server may determine whether the edge server has a cached and current (non-stale) copy of the content. In such an instance, the edge server returns the requested content to the requesting device (e.g., the client 702). Otherwise, the edge server contacts the mid-tier for an initial popularity analysis in operation 904. However, in this example, the mid-tier 708 may determine that the content is popular based on the popularity service 716.

If the content is or has become popular as determined by the popularity service 716, then the content is returned to the edge server 706 with a cache instruction. In one example, the edge server 706 may receive the content from the mid-tier 708 or may process a redirect as described above. Regardless of from which component of the CDN 704 the content is received, the edge server 706 receives the content in operation 906 and, in response to the cache instruction, caches the popular content at the content server. In operation 908, the edge server 706 provides the content to the client device 702. In this manner, the edge server 706 may provide popular content to the client device 702 in response to a request for the content by the requesting device.

In some embodiments, the edge server 706 may conduct local popularity tracking and cache based on popularity. So, for example, if the cache is full, which often times it will be, the server may replace less popular or stale content when new popular content is received. Further, the popularity of the content may be tracked on a home page basis (or other general content identifier) or on a per content basis (such as a video content accessible through a home page). Also, the popularity may be tracked using metadata associated with the content, as explained above.

Figure 10:
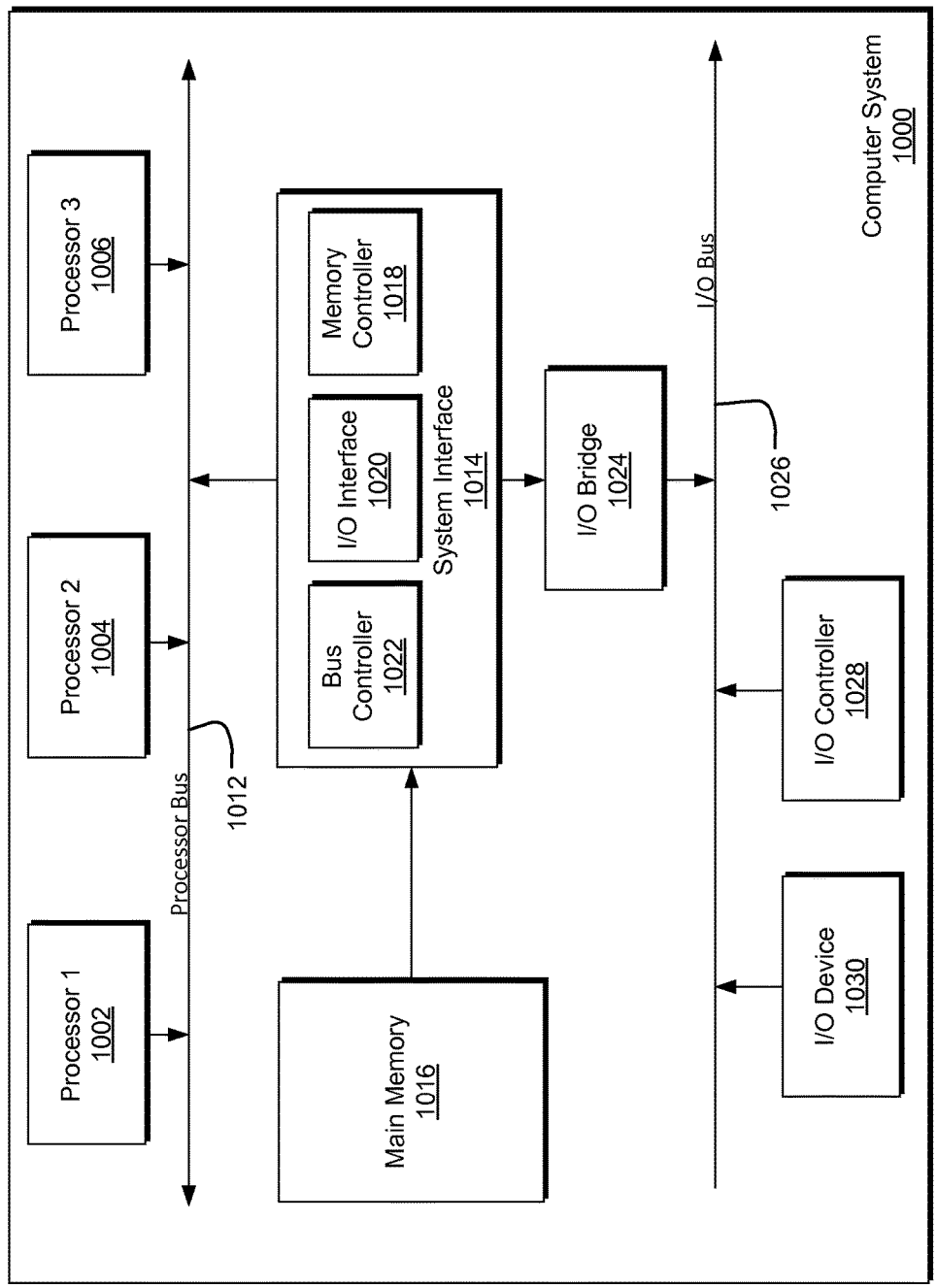
FIG. 10 is a block diagram illustrating an example of a computing system which may be used in implementing embodiments of the present disclosure

FIG. 10 is a block diagram illustrating an example of a computing device or computer system 1000 which may be used in implementing the embodiments of the components of the CDN disclosed above. For example, the content server 706 described above may be similar to the computing device of FIG. 10. The computer system (system) includes one or more processors 1002-1006. Processors 1002-1006 may include one or more internal levels of cache (not shown) and a bus controller or bus interface unit to direct interaction with the processor bus 1012. Processor bus 1012, also known as the host bus or the front side bus, may be used to couple the processors 1002-1006 with the system interface 1014. System interface 1014 may be connected to the processor bus 1012 to interface other components of the system 1000 with the processor bus 1012. For example, system interface 1014 may include a memory controller 1018 for interfacing a main memory 1016 with the processor bus 1012. The main memory 1016 typically includes one or more memory cards and a control circuit (not shown). System interface 1014 may also include an input/output (I/O) interface 1020 to interface one or more I/O bridges or I/O devices with the processor bus 1012. One or more I/O controllers and/or I/O devices may be connected with the I/O bus 1026, such as I/O controller 1028 and I/O device 1030, as illustrated.

I/O device 1030 may also include an input device (not shown), such as an alphanumeric input device, including alphanumeric and other keys for communicating information and/or command selections to the processors 1002-1006. Another type of user input device includes cursor control, such as a mouse, a trackball, or cursor direction keys for communicating direction information and command selections to the processors 1002-1006 and for controlling cursor movement on the display device.

System 1000 may include a dynamic storage device, referred to as main memory 1016, or a random access memory (RAM) or other computer-readable devices coupled to the processor bus 1012 for storing information and instructions to be executed by the processors 1002-1006. Main memory 1016 also may be used for storing temporary variables or other intermediate information during execution of instructions by the processors 1002-1006. System 1000 may include a read only memory (ROM) and/or other static storage device coupled to the processor bus 1012 for storing static information and instructions for the processors 1002-1006. The system set forth in FIG. 10 is but one possible example of a computer system that may employ or be configured in accordance with aspects of the present disclosure.

According to one embodiment, the above techniques may be performed by computer system 1000 in response to processor 1004 executing one or more sequences of one or more instructions contained in main memory 1016. These instructions may be read into main memory 1016 from another machine-readable medium, such as a storage device. Execution of the sequences of instructions contained in main memory 1016 may cause processors 1002-1006 to perform the process steps described herein. In alternative embodiments, circuitry may be used in place of or in combination with the software instructions. Thus, embodiments of the present disclosure may include both hardware and software components.

A machine readable medium includes any mechanism for storing or transmitting information in a form (e.g., software, processing application) readable by a machine (e.g., a computer). Such media may take the form of, but is not limited to, non-volatile media and volatile media. Non-volatile media includes optical or magnetic disks. Volatile media includes dynamic memory, such as main memory 1016. Common forms of machine-readable medium may include, but is not limited to, magnetic storage medium; optical storage medium (e.g., CD-ROM); magneto-optical storage medium; read only memory (ROM); random access memory (RAM); erasable programmable memory (e.g., EPROM and EEPROM); flash memory; or other types of medium suitable for storing electronic instructions.

It should be noted that the flowcharts of FIGS. 5, 8, and 9 are illustrative only. Alternative embodiments of the present invention may add operations, omit operations, or change the order of operations without affecting the spirit and scope of the present invention. The foregoing merely illustrates the principles of the invention. Various modifications and alterations to the described embodiments will be apparent to those skilled in the art in view of the teachings herein. It will thus be appreciated that those skilled in the art will be able to devise numerous systems, arrangements and methods which, although not explicitly shown or described herein, embody the principles of the invention and are thus within the spirit and scope of the present invention. From the above description and drawings, it will be understood by those of ordinary skill in the art that the particular embodiments shown and described are for purposes of illustrations only and are not intended to limit the scope of the present invention. References to details of particular embodiments are not intended to limit the scope of the invention.

Various documents, including patents and patent applications, have been incorporated by reference into this application. In case of any conflict between an incorporated document and the present application, the present application, including any definitions herein, will control.

We claim:

1. A method of content delivery in a content delivery network comprising:
   receiving, at a first server of a first tier of servers of the content delivery network, a request from a requesting device for a portion of a resource available from the content delivery network;
   determining whether the portion of the resource is an initial portion of the resource; accessing a popularity service associated with the content delivery network to determine a popularity designation associated with the resource, wherein the popularity designation associated with the resource indicates that the resource is not popular;
   requesting the portion of the resource from a second server of the content delivery network;
   processing, at the first server of the first tier of servers, a redirect instruction from the second server of the content delivery network to obtain the portion of the resource from a content server of the content delivery network;
   receiving an instruction to not cache the portion of the resource at the first server of the first tier of servers when the portion of the resource is obtained from the content server of the content delivery network; and
   providing, from the first server of the first tier of servers, the obtained portion of the resource to the requesting device.

2. The method of claim 1 wherein the second server is a metro mid-tier server of the content delivery network.

3. The method of claim 1 wherein the second server is a peer server of the first tier of servers of the content delivery network.

4. The method of claim 1 wherein the popularity designation associated with the resource comprises an indication whether a current popularity value for the resource exceeds a first predetermined popularity threshold.

5. The method of claim 4 wherein the popularity service is associated with the second server of the content delivery network.

6. The method of claim 4 wherein the popularity service is associated with the first server of the first tier of servers of the content delivery network.

7. The method of claim 1 wherein the content delivery network further comprises a second tier of servers distinct from the first tier of servers, and wherein the second server is in the second tier of servers.

8. The method of claim 1 further comprising:
   receiving, at the first server of the first tier of servers of the content delivery network, an additional request for another portion of the resource available from the content delivery network;
   determining that the another portion of the resource is cached at the first server of the first tier of servers; and
   providing the cached another portion of the resource from the first server of the first tier of servers in response to the additional request for the another portion of the resource.

9. A content delivery network comprising:
   a first plurality of servers, an edge server of the first plurality of servers receiving a request from a requesting device in communication with the first server for a portion of a resource available from the content delivery network;
   a second plurality of servers, a first server of the second plurality of servers receiving a request from the edge server for the portion of the resource and, in response, transmitting a redirect instruction to the edge server to obtain the portion of the resource from a content server and transmitting an instruction to not cache the portion of the resource at the edge server when the portion of the resource is obtained from the content server; and
   a popularity service tracking a popularity designation associated with the resource only when the portion of the resource is an initial portion of the resource, wherein the popularity designation associated with the resource indicates that the resource is not popular;
   wherein the edge server processes the redirect instruction to obtain the portion of the resource from the content server and provides the obtained portion of the resource to the requesting device.

10. The content delivery network of claim 9 wherein the first server of the second plurality of servers is a metro mid-tier server of the content delivery network.

11. The content delivery network of claim 9 wherein the first server of the second plurality of servers is a peer server of the first plurality of servers of the content delivery network.

12. The content delivery network of claim 9 wherein the popularity designation associated with the resource comprises an indication whether a current popularity value for the resource exceeds a first predetermined popularity threshold.

13. The content delivery network of claim 12 wherein the popularity service is associated with the first server of the second plurality of servers of the content delivery network.

14. The content delivery network of claim 12 wherein the popularity service is associated with the content server of the first plurality of servers of the content delivery network.

* * * * *